United States Patent [19]
Hanser et al.

[11] Patent Number: 5,983,576
[45] Date of Patent: Nov. 16, 1999

[54] EXTENDABLE ROOM

[75] Inventors: Paul E. Hanser, Tipton, Iowa; William G. Reckmeyer, Skaneateles, N.Y.; Stacy M. Hanser; Marc E. Frerichs, both of Davenport, Iowa

[73] Assignee: HWH Corporation, Moscow, Iowa

[21] Appl. No.: 08/895,210

[22] Filed: Jul. 16, 1997

[51] Int. Cl.$^6$ ...................................................... E04B 1/344
[52] U.S. Cl. ...................... 52/67; 52/70; 52/71; 296/165; 296/170; 296/171; 296/172; 296/174; 296/175; 296/176
[58] Field of Search .................................... 52/67, 70, 71; 296/26, 165, 170, 171, 172, 174, 175, 176, 26.1

[56] References Cited

U.S. PATENT DOCUMENTS

| | | | |
|---|---|---|---|
| 1,513,227 | 10/1924 | Cornelius et al. | 296/176 |
| 3,160,435 | 12/1964 | Smith | 296/176 |
| 3,257,760 | 6/1966 | Calthorpe | 296/26 X |
| 3,534,512 | 10/1970 | Ballas | 52/71 X |
| 3,811,723 | 5/1974 | Anderson | 296/172 X |
| 3,834,005 | 9/1974 | Johnson | 52/70 X |
| 4,912,892 | 4/1990 | Jurgensen | 52/71 X |
| 4,955,661 | 9/1990 | Mattice | 296/171 |
| 5,345,730 | 9/1994 | Jurgensen | 52/71 X |

FOREIGN PATENT DOCUMENTS

| | | | |
|---|---|---|---|
| 290795 | 3/1967 | Australia | 52/67 |

*Primary Examiner*—Robert Canfield
*Attorney, Agent, or Firm*—Henderson & Sturm

[57] ABSTRACT

An extendable room comprises accordion type ceiling and wall panels which fold within panel covers when the room is retracted, thereby taking up much less interior space and leaving the interior of the primary structure just as attractive, albeit smaller, as prior to retraction. The wall and ceiling panels are hinged together with tongue and groove connections and are secured in the flat, extended configuration by steel cables running through the panels. The side walls also include windows which may be made clear and opaque electronically. The secondary floor is retractable below the floor of the primary structure when the room is retracted, permitting the room extension floor to become the primary floor.

5 Claims, 11 Drawing Sheets

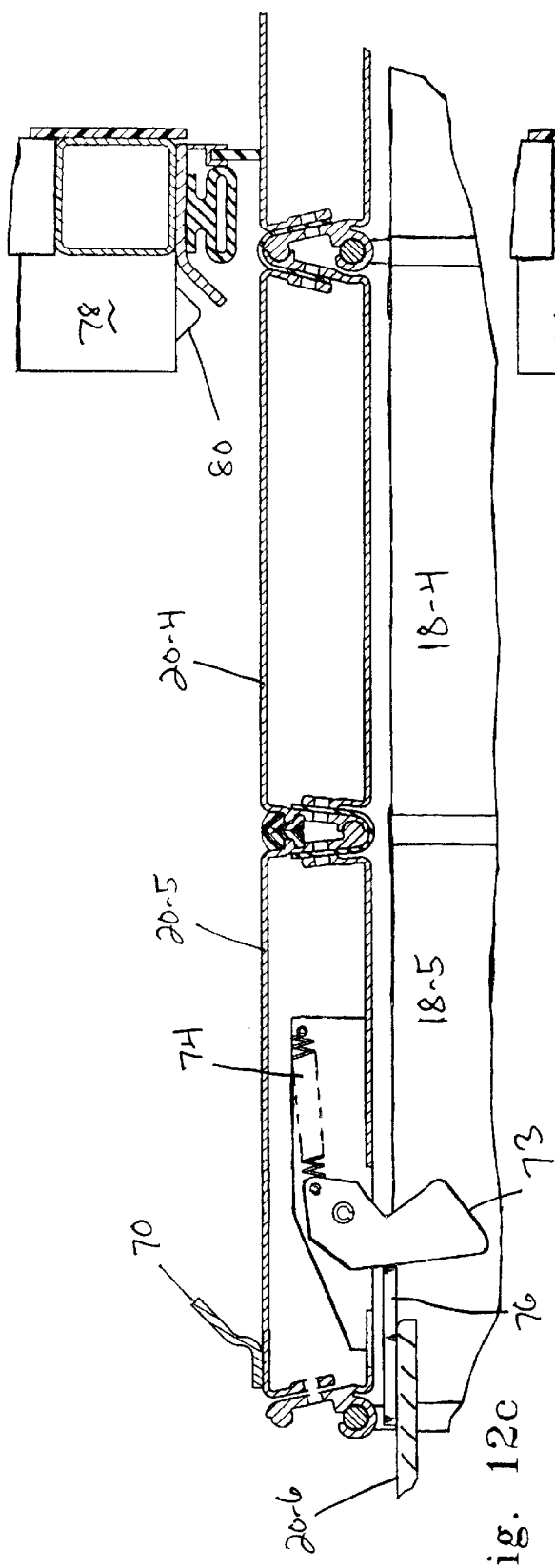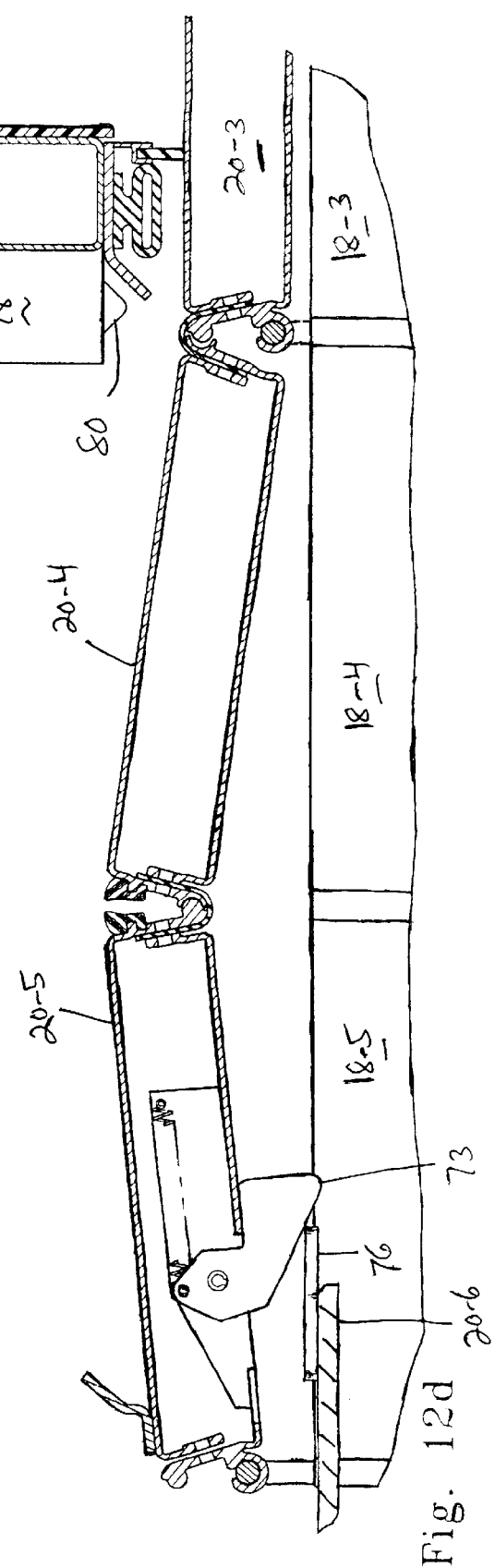
Fig. 12c
Fig. 12d

EXTENDABLE ROOM

CROSS-REFERNECE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to rooms which may be extended and retracted with respect to a primary structure, and more particularly to such rooms designed for recreational vehicles and motor homes.

2. Description of the Related Art

It has become common in the motor home and recreational vehicle arts to provide modular rooms which are retracted into the home or vehicle when it is moved or is traveling down the highways and which may then be extended when the vehicle is stopped. This, of course, can greatly increase the living space within the vehicle, providing much greater comfort.

Room extensions currently available utilize rigid walls, ceilings, and floors which, when retracted within the vehicle, necessarily take up a great deal of space, are quite unsightly, and make movement within the vehicle difficult.

BRIEF SUMMARY OF THE INVENTION

The extendable room that forms the basis of the present invention comprises accordion type ceiling and wall panels which fold within panel covers when the room is retracted, thereby taking up much less interior space and leaving the interior of the vehicle just as attractive, albeit smaller, as prior to retraction. The wall and ceiling panels are hinged together with tongue and groove connections and are secured in the flat, extended configuration by steel cables running through the panels. The side walls also include windows which may be made clear and translucent electronically. The secondary floor is retractable below the floor of the vehicle when the room is retracted, permitting the room extension floor to become the primary vehicle floor.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein:

FIG. 11 also shows the ceiling panel cover extended and an intermediate position of the ceiling panels during room extension in solid lines with side wall panels removed for clarity;

FIG. 12c is a view similar to FIG. 12a with room retraction underway;

FIG. 12d is a view similar to FIG. 12a with panel folding begun; and

DETAILED DESCRIPTION OF THE INVENTION

Figure 1:
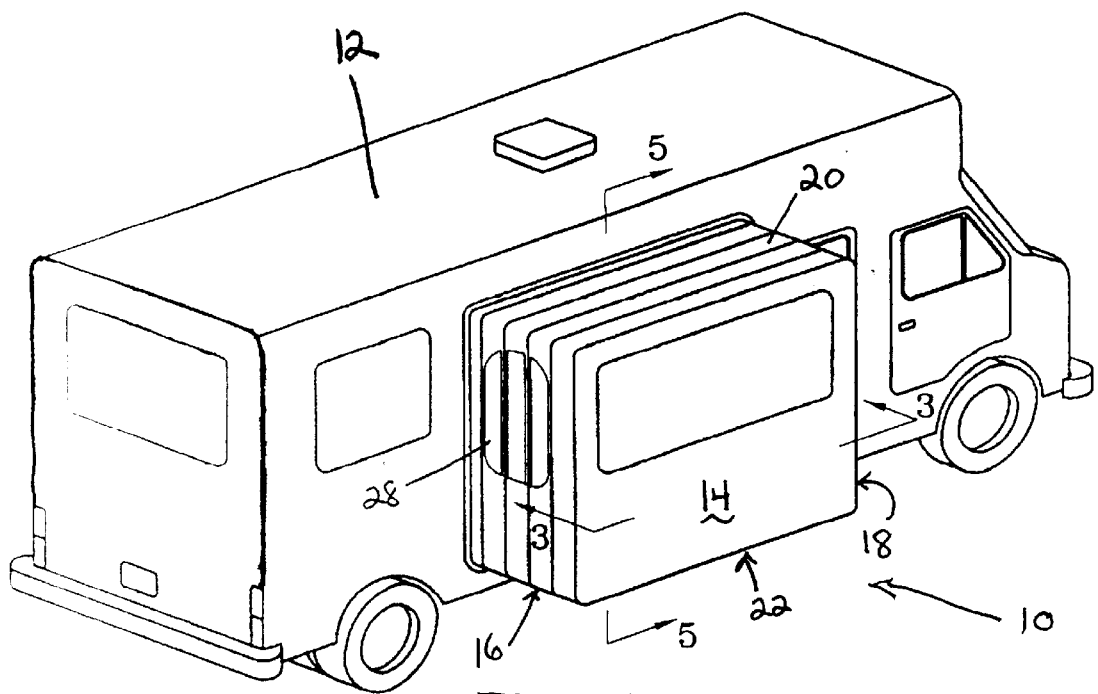
FIG. 1 is a perspective view showing a recreational vehicle equipped with the extendable room of the present invention with the room extended.
Figure 2:
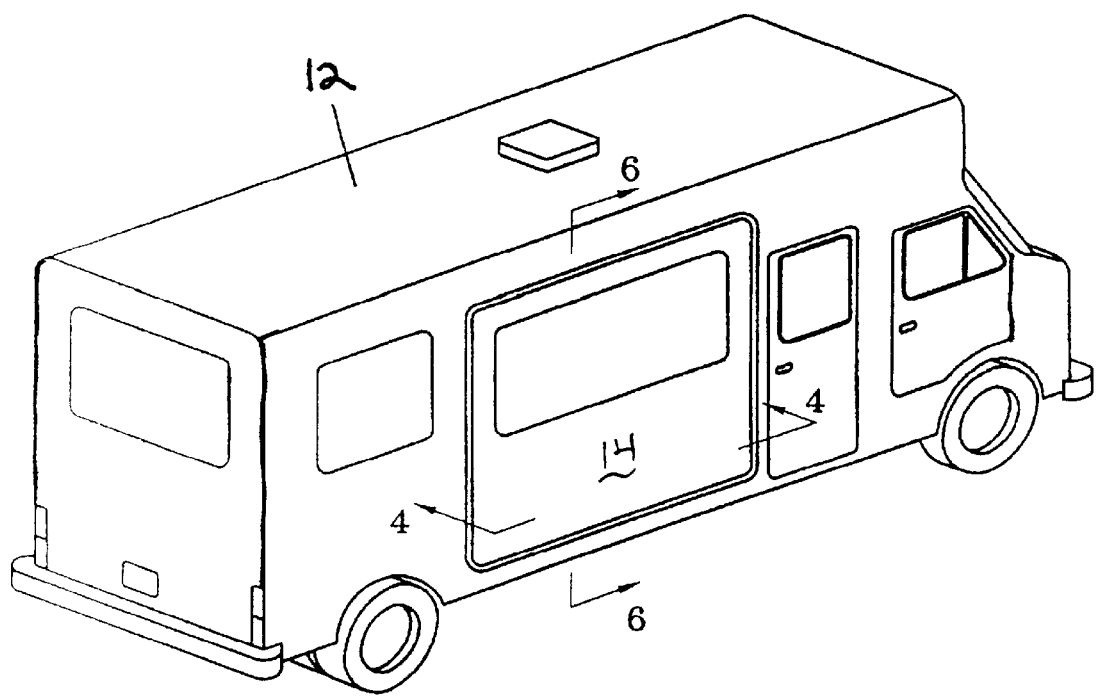
FIG. 2 is a perspective view showing the recreational vehicle of FIG. 1 with the room retracted.

Referring now to the drawings, wherein like reference numerals designate identical or corresponding parts throughout the several views, FIG. 1 shows the extendable room of the present invention depicted generally at 10 extending from the side of a recreational vehicle 12, while the room is shown retracted in FIG. 2. The extendable room 10 comprises an outer wall 14, folding side walls 16, 18, a folding ceiling 20, and a non-folding floor 22. The two folding side walls 16, 18 each contain window panel components which together form folding windows 28 and which are selectively made clear or translucent by the application of an electrical current, thus eliminating the need of curtains for privacy.

Figure 3:
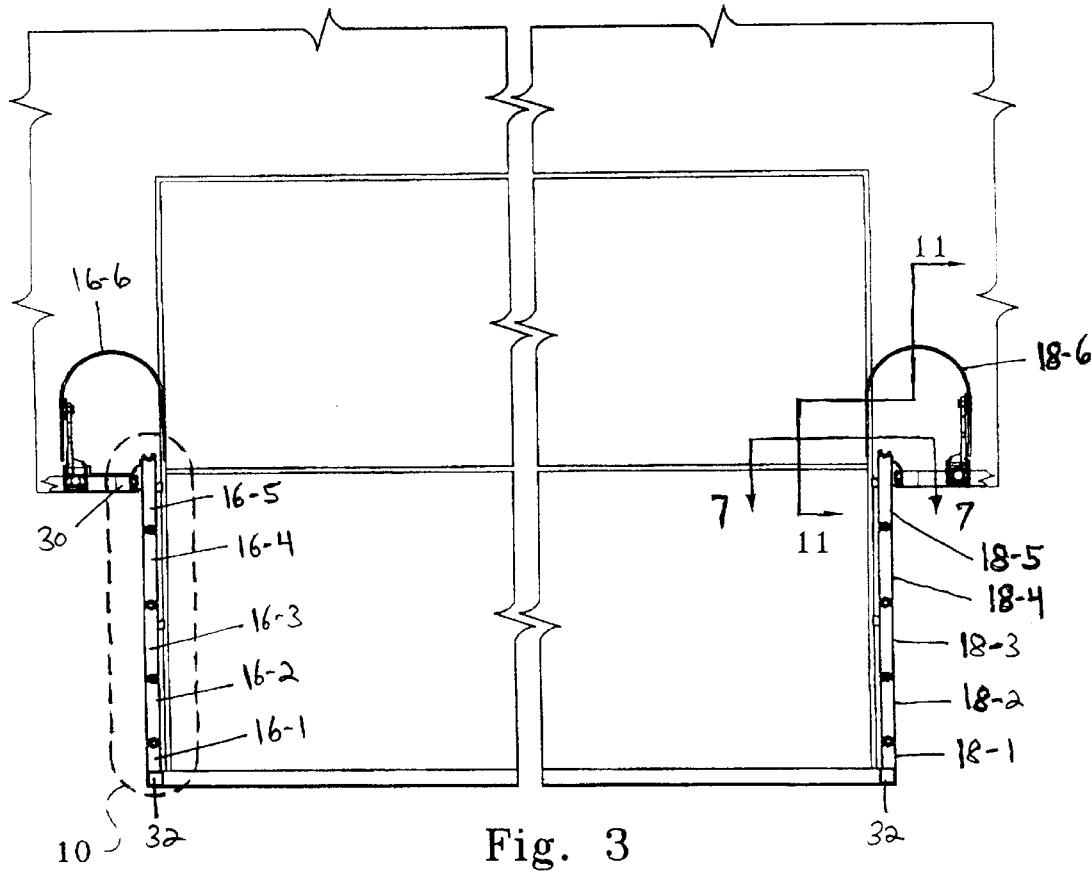
FIG. 3 is a top sectional view taken along line 3—3 of FIG. 1.
Figure 4:
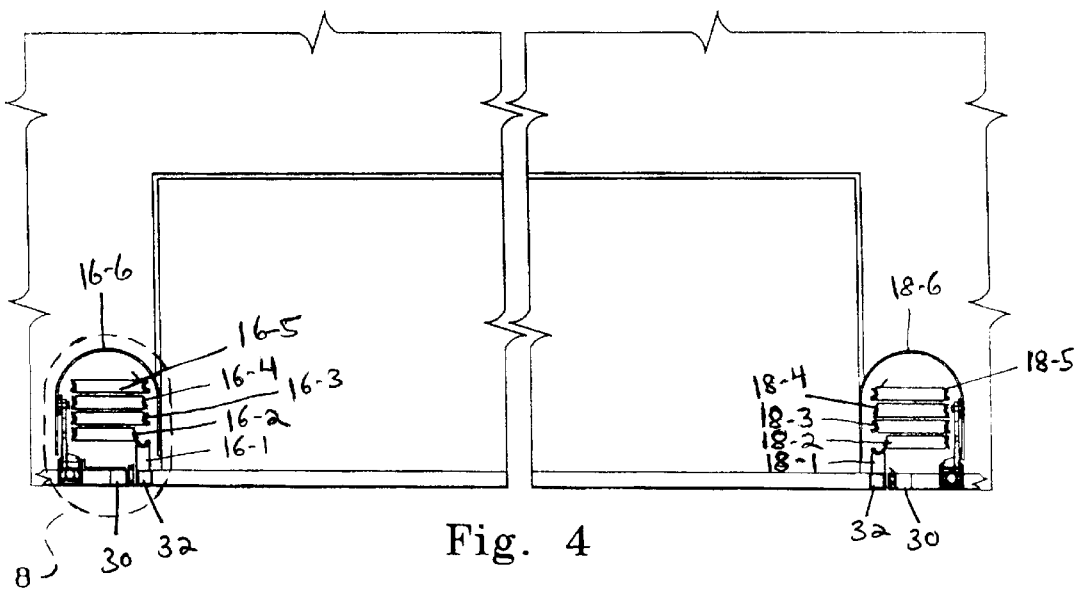
FIG. 4 is a top sectional view taken along line 4—4 of FIG. 2.

Referring now to the top sectional view of FIG. 3, the invention 10 includes a steel, rectangular primary support frame 30 disposed within the side of the vehicle 12 and a rectangular room support frame 32 which is movable between a retracted and an extended position by means of a hydraulic extension/retraction system as disclosed in U.S. Pat. No. 5,511,459 and hereby incorporated by reference. The two side walls 16, 18 each include a first fixed side panel 16-1, 18-1, secured to the sides of the room support frame 32, and four folding side panels 16-2, 16-3, 16-4, 16-5 and 18-2, 18-3, 18-4, 18-5. The invention further includes a pair of movable side panel covers 16-6, 18-6 for covering the folded side panels when the room is retracted as seen in FIG. 4.

Figure 5:
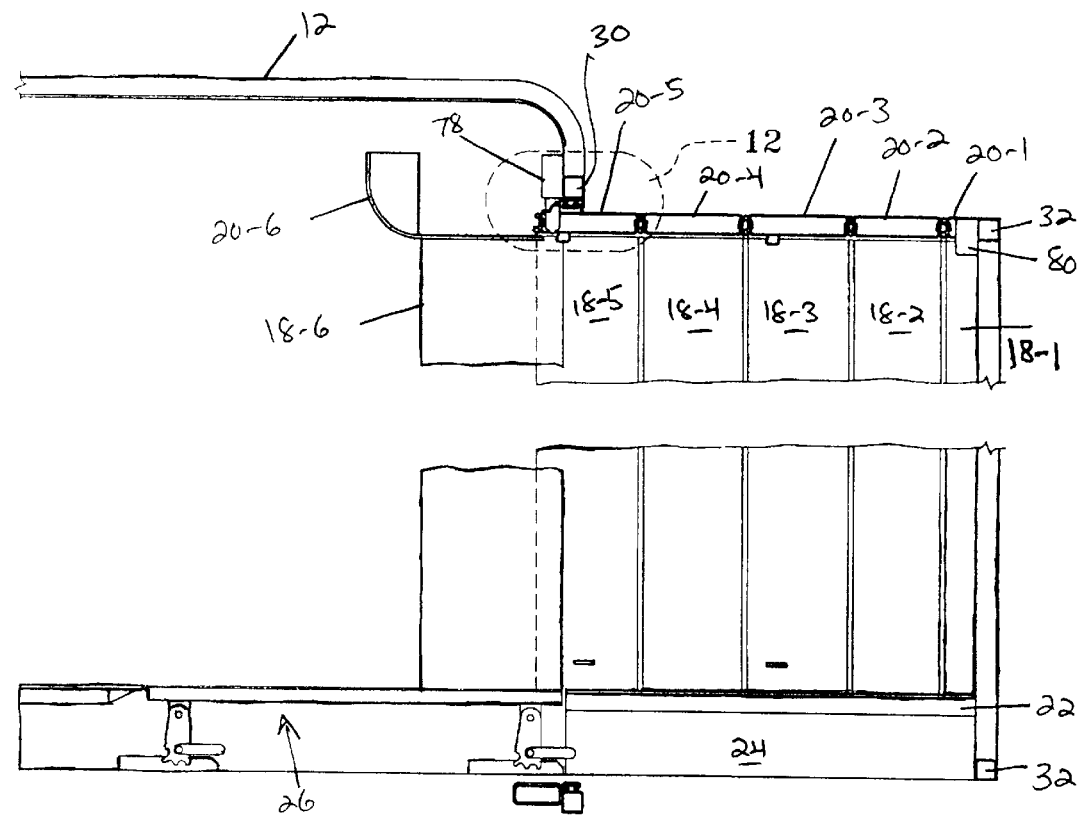
FIG. 5 is a side sectional view taken along line 5—5 of FIG. 1.
Figure 6:
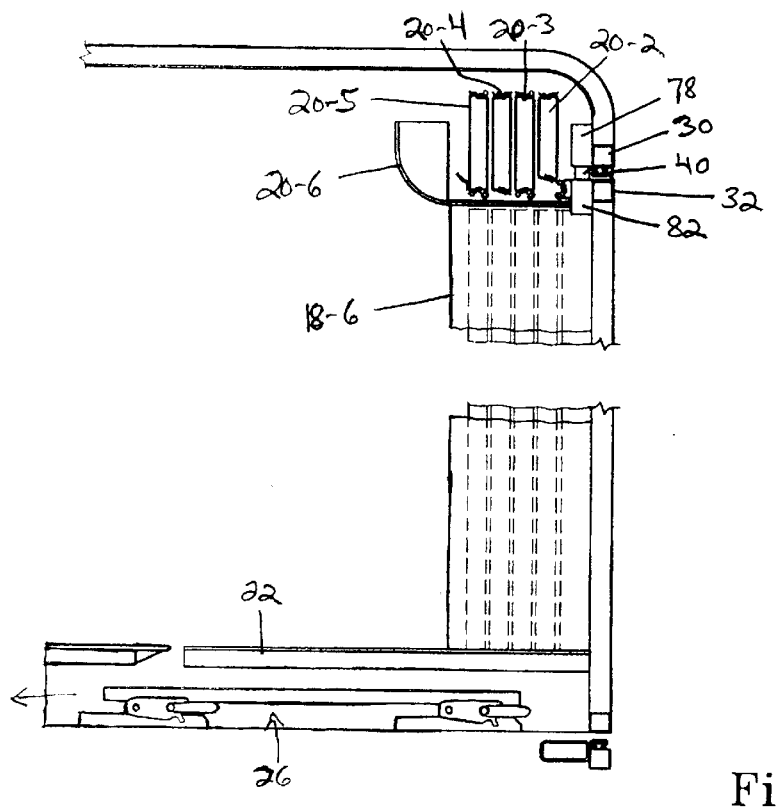
FIG. 6 is a side sectional view taken along line 6—6 if FIG. 2.

Referring now to the side sectional view of FIG. 5, the invention 10 also includes a folding ceiling 20 having a first fixed ceiling panel 20-1 secured to the top of the room support frame 32, and four folding ceiling panels 20-2, 20-3, 20-4, 20-5. The invention further includes a ceiling panel cover 20-6 for covering the folded ceiling panels when the room is retracted as seen in FIG. 6. FIGS. 5 and 6 also clearly depict the room floor 22 and substructure 24 associated with the hydraulic extension/retraction system. Also shown is the retractable floor 26, which retracts/lowers when the room is retracted to allow space for the room floor 22 and substructure 24 as described in U.S. patent application Ser. No. 08/774,326 which is hereby incorporated by reference.

Figure 7:
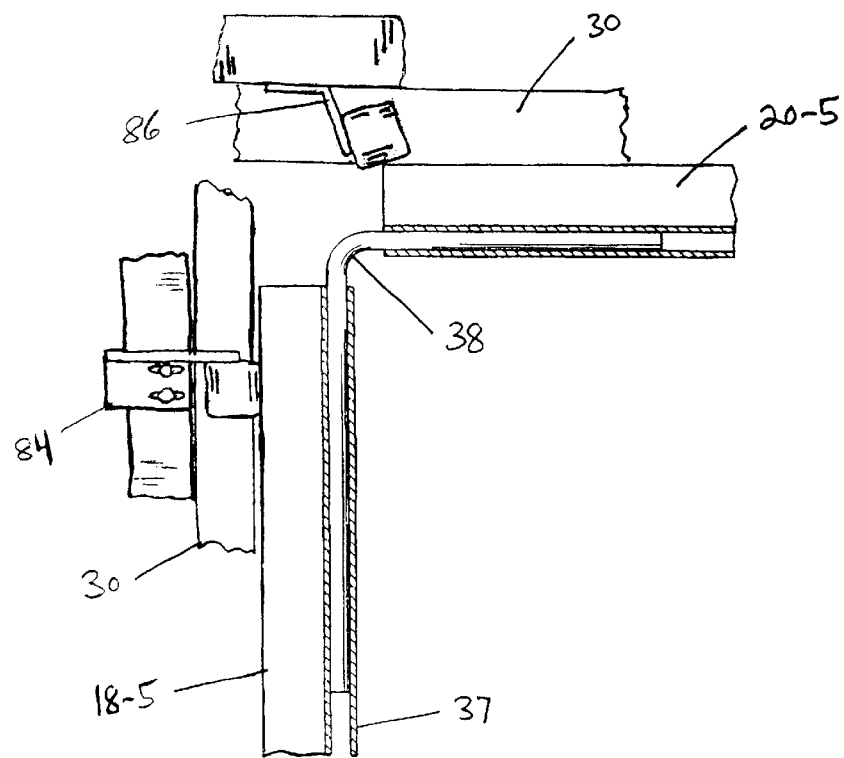
FIG. 7 is a sectional view taken along line 7—7 of FIG. 3.
Figure 7:
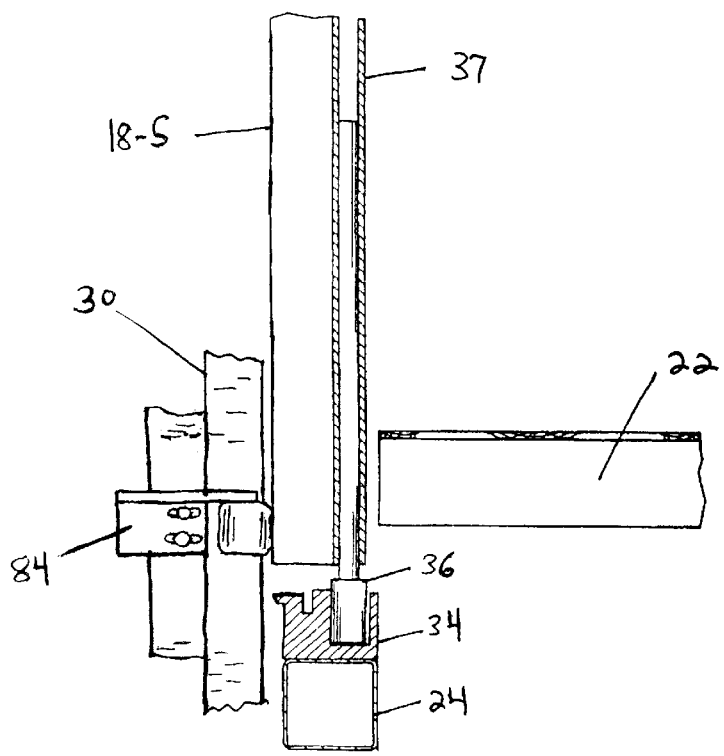

Referring also now to FIG. 7, it is to be noted that as the room retracts and extends, the various side and ceiling panels 2,3,4,5 fold and unfold as the side walls 16, 18 are guided in an accordion fashion by means of a slotted guide 34 running along each side of the substructure 24. A guide pin 36, extending downward from the lower end of a tube 37 affixed along the inner edge of side wall panel 18-5, rides in the slotted guide 34. Similar tubes 37 are present at the inner edge of panels 18-1 and 18-3, and an additional guide pin 36 extends downward from tube 37 on panel 18-3. The opposing side wall 16 is likewise configured. With continued reference to FIG. 7, the side wall panel 18-5 is connected to ceiling panel 20-5 by means of an angled connector rod 38 extending from the upper end of the tube 37. Similar angled connector rods 38 are present to connect panel 18-1 to 20-1, and 18-3 to 20-3. The opposing side wall 16 is likewise connected to the ceiling 20 with three connector rods 38. It should now be apparent to one skilled in the art that this arrangement allows the side walls 16, 18 and ceiling 20 to move together during extension and retraction while permitting the various panels to fold and unfold together in an accordion fashion. As an aid to the unfolding action of the side wall panels, a pair of roller assemblies 84 are secured adjacent the inner face of the primary support frame 30 near the top and bottom of each side. These roller assemblies 84 contact the folded panels and force them inward into a flattened configuration just before they pass the primary support frame. Likewise, a pair of roller assemblies 86 perform the same function for the ceiling panels.

Figure 8:
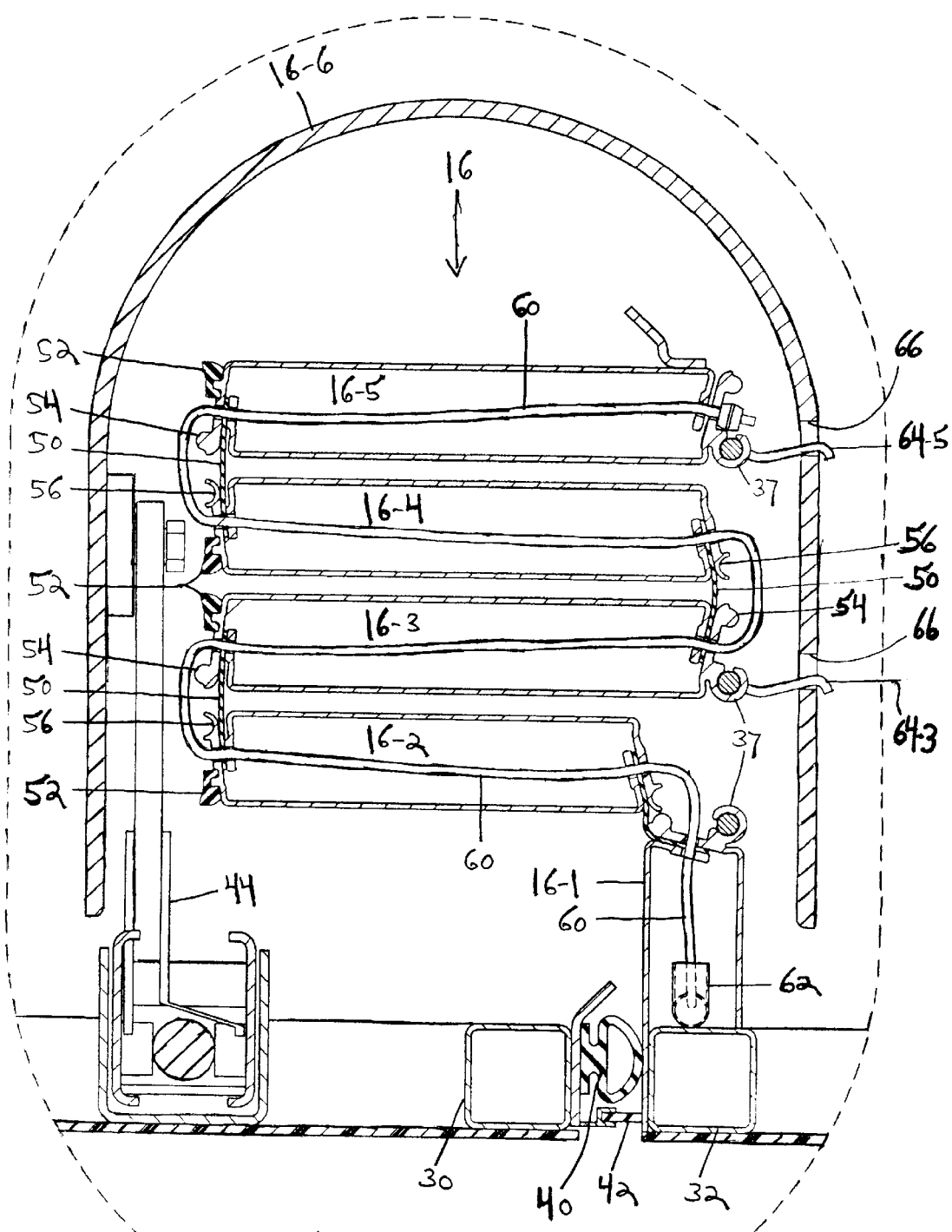
FIG. 8 is an enlarged view of the area enclosed within dashed line 8 of FIG. 4 with the room retracted and showing a wall panel folded within its panel cover.
Figure 9:
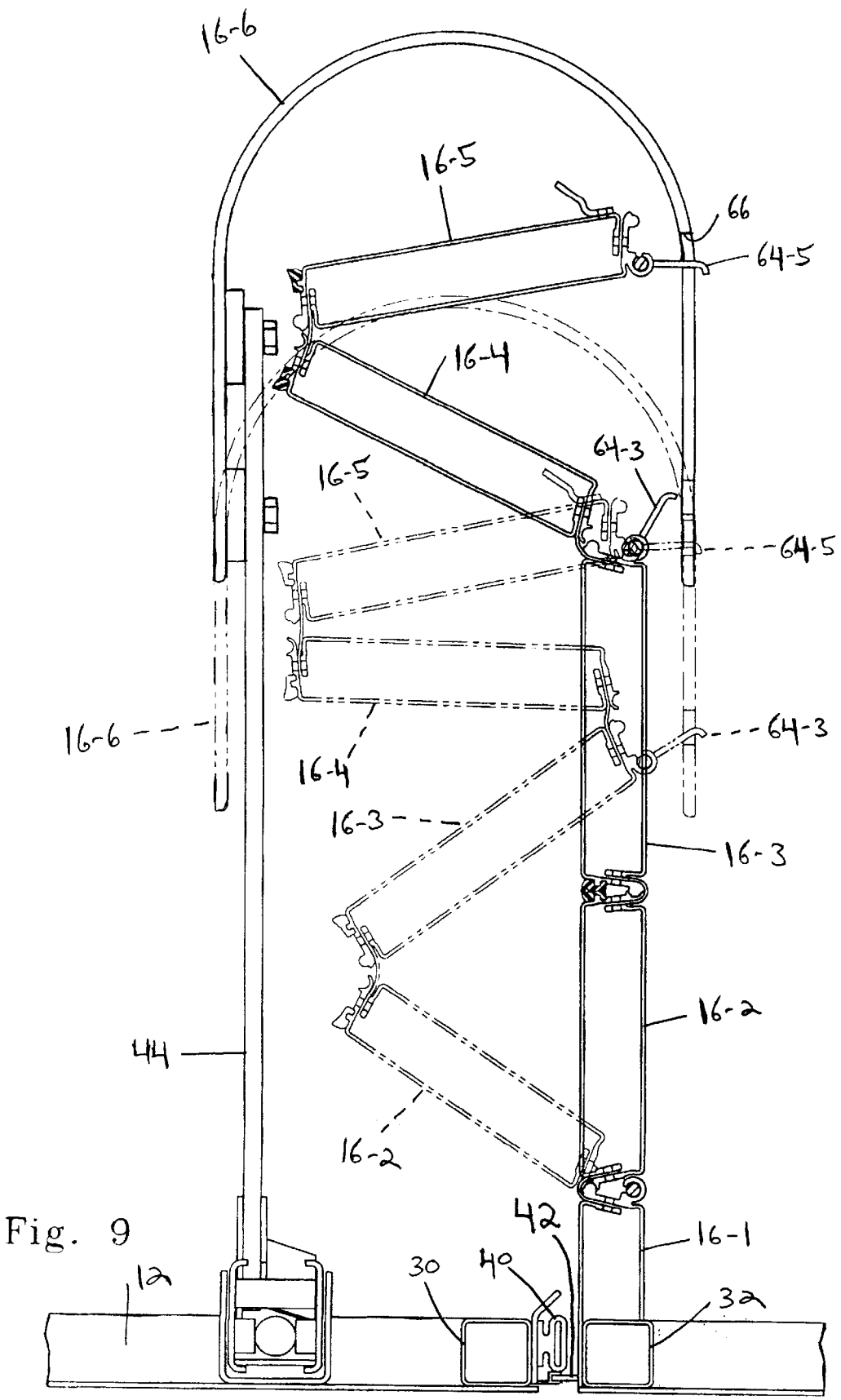
FIG. 9 is a view similar to FIG. 8 but showing two intermediate positions of the extension process.
Figure 10:
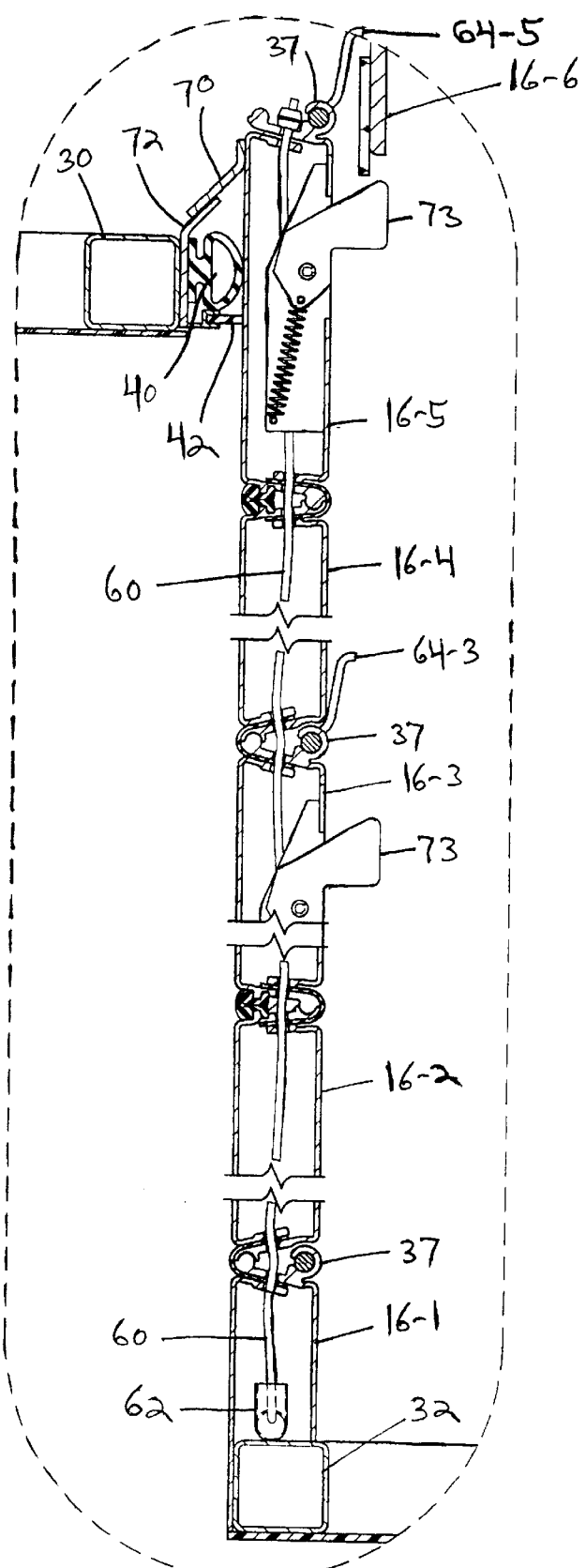
FIG. 10 is an enlarged view of the area enclosed within dashed line 10 of FIG. 3 with the room extended.

Referring now to FIGS. 8 through 10, the structure of the side walls 16, 18 and ceiling 20 as well as the mechanism of their extension and retraction will be described in further detail. In FIG. 8, the room is retracted within the vehicle 12 and side wall 16 is shown folded within side wall cover 16-6. An inflatable rubber seal 40, which runs around the inner periphery of the primary support frame 30, is inflated so as to provide a seal between the vehicle and the room. A secondary rubber seal 42 provides a minimal level of insulation during extension and retraction when the primary seal 40 is not inflated and helps prevent debris from entering the vehicle during retraction, particularly that which may have accumulated on the ceiling 20 and may interfere with the folding of the ceiling panels. Each of the folding wall panels 16-1, 16-2, 16-3, 16-4, 16-5 is of double walled aluminum, insulated construction. The various panels are hinged together by durable, flexible strips 50 which are sandwiched between the inner and outer walls of the respective panels, separating the same and thereby providing a thermal conductivity break as well as a hinge. Each panel also includes a strip 52 running along one edge for added insulation and for providing a water seal when the room is extended. The panels alternately employ a tongue 54 and groove 56 interlocking system along the panel edges which mate when the panels are extended. Each tongue 54 and groove 56 is a continuation of the aluminum inner and outer panel walls and thus, when mated at extension, provide a metal barrier along the panel hinges for security against forced entry by cutting the strips 50. For additional security and room integrity, the side wall includes steel cables 60 (FIGS. 8 and 10) which are secured at the inner edge of panel 16-5 and run horizontally through the centers of the various panels to a tube 62, attached to the room support frame 32, from where they are directed to a hydraulically powered tensioning device (not shown) in the room substructure 24. Thus, the cables 60 are loosened to permit the panels to fold but are pulled taut when the panels are extended to hold them firmly together. Panels 18-1, 18-2, 18-3, 18-4, 18-5 and 20-1, 20-2, 20-3, 20-4, 20-5 are configured similarly.

Also seen in FIGS. 8 through 10 are a pair of hooks 64-3, 64-5 secured to the guide pins 36 through slots in connector rod tubes 37 of panels 16-5 and 16-3, which engage small apertures 66 in the panel cover 16-6 when the room is retracted and the side wall 16 is enclosed within the panel cover 16-6. The purpose of these hooks 64-3, 64-5 is to permit panels 16-2 and 16-3 to unfold first during the extension process so they can slide by the deflated seal 40. As seen in FIG. 9 in dashed lines, the panel cover 16-6 has partially extended and, since the hooks 64-3, 64-5 are engaged with the panel cover 16-6, panels 16-2 and 16-3 have begun to unfold. As the panel cover 16-6 reaches its full extension shown in solid lines, panels 16-2 and 16-3 are fully unfolded and hook 64-3 has disengaged from panel cover 16-6. At this time the actual room extension begins as the room support frame 32 moves away from the primary support frame 30. In FIG. 10 the room is seen to be fully extended with the various panels of side wall 16 unfolded and the seal 40 inflated. A flange 70 secured along the edge of panel 16-5 engages a second flange 72 secured along the primary support frame 30 for additional room integrity. Also shown in FIG. 10 are a pair of bumpers 73 which will be described below. Wall 18 is configured similarly.

Figure 11:
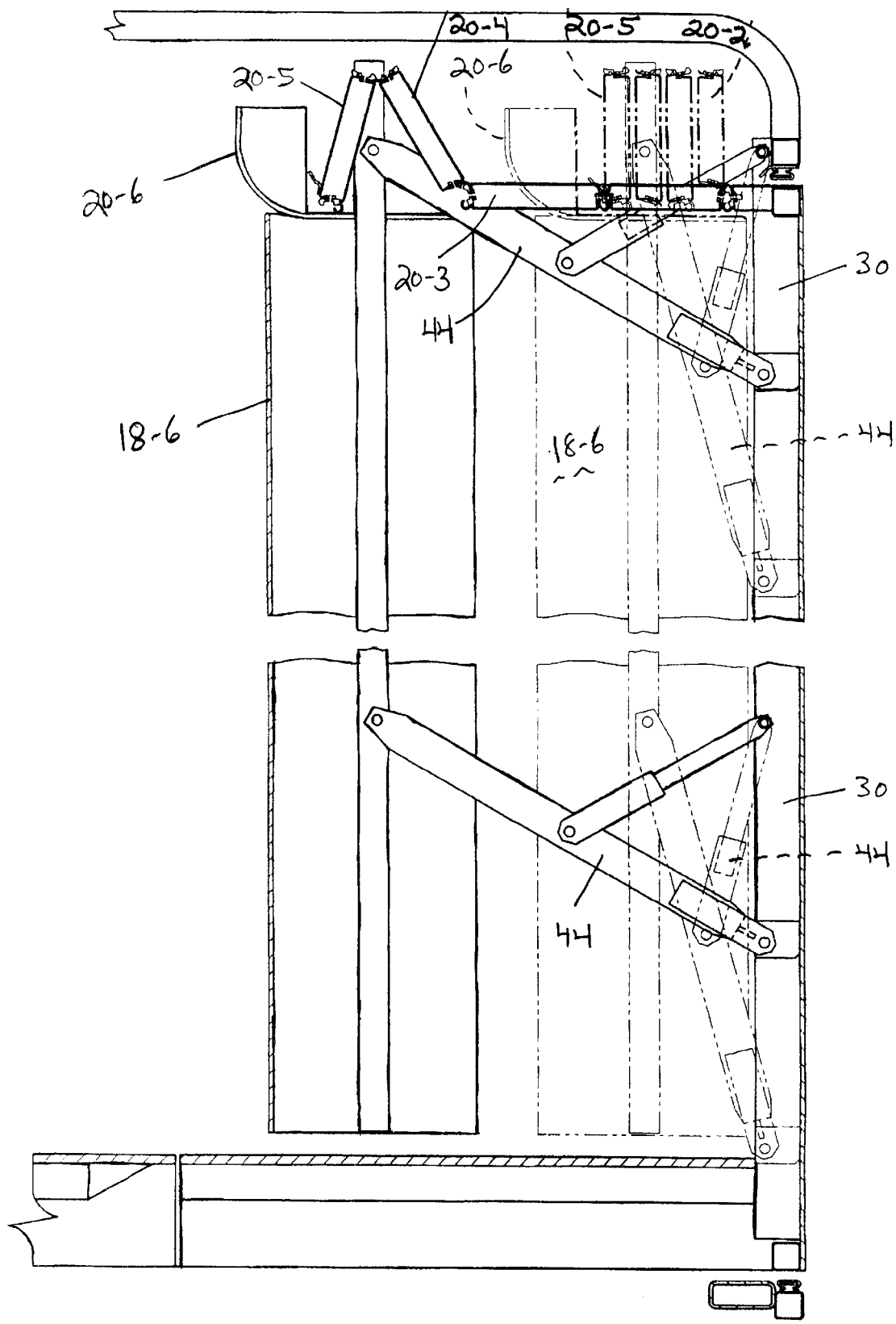
FIG. 11 is a side sectional view through the center of the room looking forward in the area defined by line 11—11 of FIG. 3, with the dashed lines showing the room retracted and the ceiling panels folded within the ceiling panel cover.

Referring now primarily to FIG. 11, the room is retracted and the side wall cover 18-6 and the ceiling cover 20-6 are seen in the retracted position in dashed lines with the ceiling cover 20-6 enclosing the various ceiling panels 20-1 through 20-5. The ceiling cover 20-6 and side wall cover 18-6 are shown extended in solid lines, with ceiling panels 20-2 and 20-3 having been unfolded by the simultaneous movement of their respective side panels through connector rods 38. The extension and retraction of the two side wall covers 16-6, 18-6 and the integral ceiling cover 20-6 is accomplished by means of a pair of hydraulically actuated scissor mechanisms 44 coupled to and extending between the primary support frame 30 and each side wall cover 16-6, 18-6. These scissor mechanisms 44 are shown retracted in dashed lines and extended in solid lines in FIG. 11.

Figure 12A:
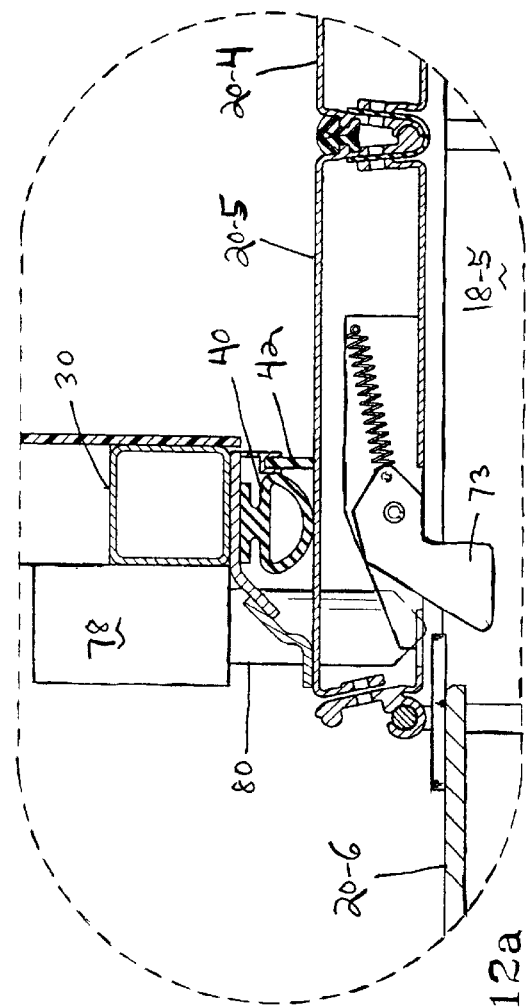
FIG. 12a is an enlarged view of the area enclosed within dashed line 12a of FIG. 5.
Figure 12B:
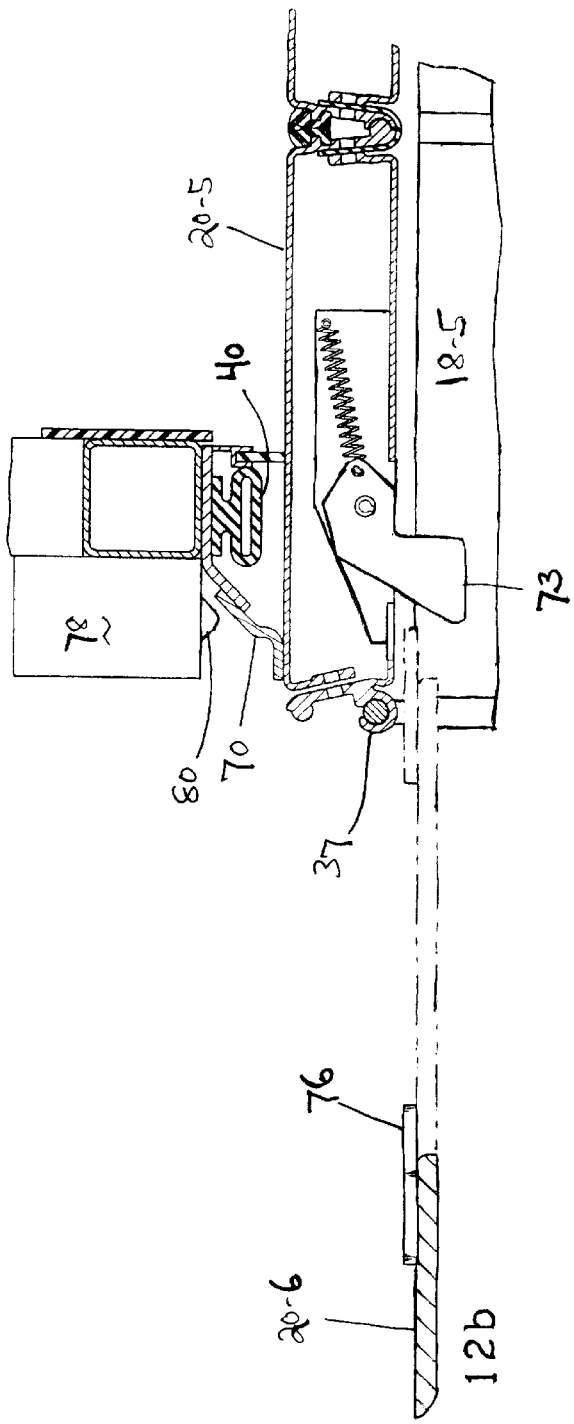
FIG. 12b is a view similar to FIG. 12a with the ceiling panel cover retracted.
Figure 12E:
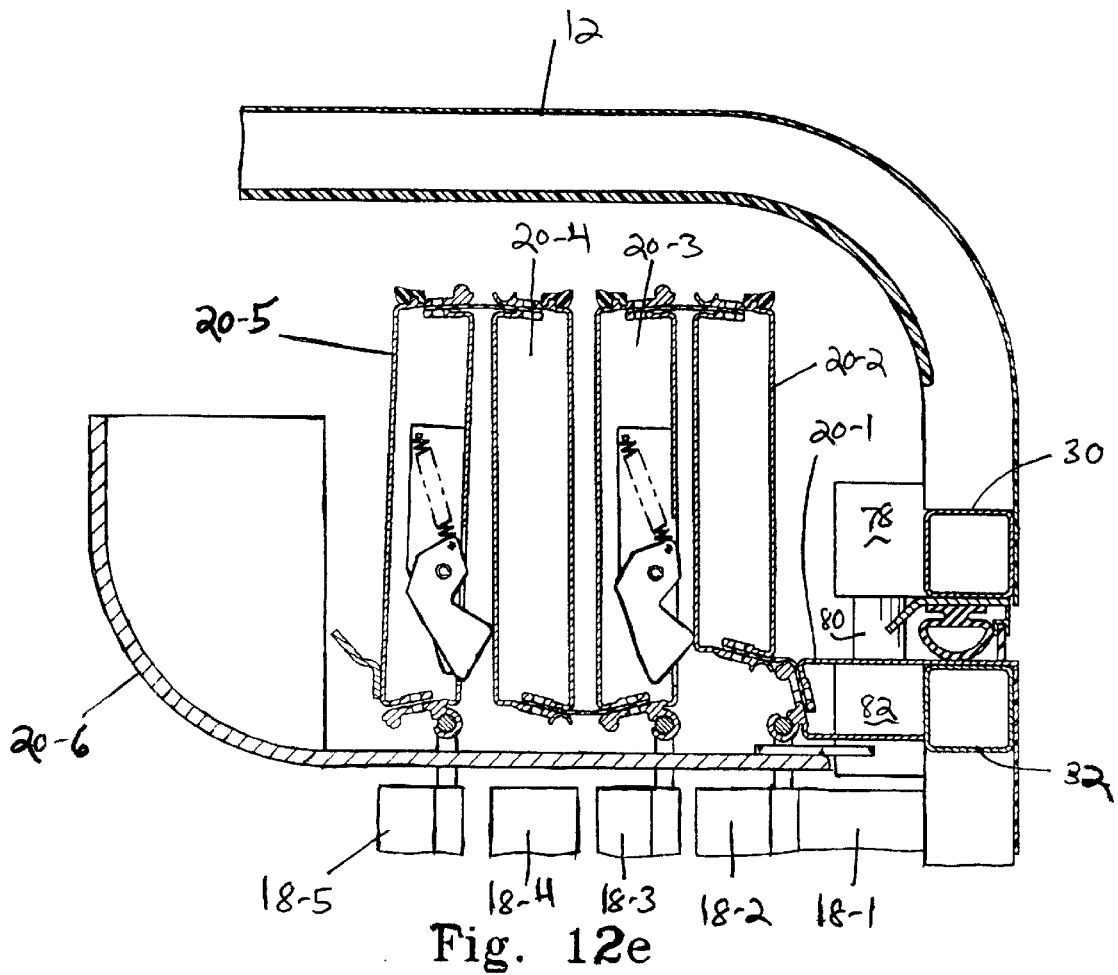
FIG. 12e is a view similar to FIG. 12a with room retraction complete.

Referring now to FIG. 12a–e, the retraction of the ceiling 20 will be described in more detail, understanding that the side walls 16, 18 retract simultaneously in an identical manner. In FIG. 12a the room is extended, the ceiling panels 20-1 through 20-5 are unfolded with the internal cable (not shown) taut, the ceiling panel cover 20-6 is retracted and the seal 40 is inflated. In addition, a pair of locking pins 80 (only one shown) have extended from locking pin hydraulic cylinders 78 into engagement with locking pin receivers (not shown for clarity) secured within panel 20-5. In FIG. 12b, the locking pin 80 is retracted, the seal 40 is deflated, and the ceiling cover 20-6 has extended. In FIG. 12c, the room has retracted the width of panels 20-5 and 20-4, at which time the internal cable is released and a bumper device 73, pivotally mounted within panel 20-5 and held in a neutral position (FIG. 12b) by a spring 74, strikes a bumper plate 76 mounted on the panel cover 20-6 and begins to pivot. As retraction continues in FIG. 12d, the bumper device 73 pivots until it strikes the inside face of panel 20-5, forcing it outward and initiating folding of panels 20-5 and 20-4. As room retraction continues and panels 20-5 and 20-4 fold together, the bumper device 73 is first drawn back to its neutral position by the spring 74 and is then forced to pivot within panel 20-5 by the face of panel 20-4 (FIG. 12e). An identical bumper device, installed within panel 20-3, initiates the folding of panels 20-3 and 20-2. In FIG. 12e, the room has completed retraction and the ceiling 20 is shown folded and enclosed within the now retracted ceiling cover 20-6. In addition, the seal 40 has reinflated and the locking pins 80 have extended to within their locking pin receivers 82 to secure the room within the vehicle.

OPERATION

In a preferred embodiment, the operation of the room extension and retraction is hydraulically actuated and electronically controlled by a series of relays, solenoid valves, and limit switches which sense various vehicle parameters and the position of the room during movement and permit or inhibit further operations. Other embodiments could use a microprocessor, hydraulic sequencing, or electric actuators. The room extension sequence is as follows:

1. The inflatable seal 40 between the primary support frame 30 and the room support frame 32 deflates.
2. The locking pins 80 retract and the panel covers 16-6, 18-6, 20-6 extend. The extension of the panel covers straightens out panels 2 and 3 of the side walls 16, 18 and ceiling 20.
3. The hydraulic actuator extends the room support frame 32 away from the primary support frame 30, causing panels 4 and 5 to straighten out.
4. The internal panel cables 60 are tightened hydraulically, securing the panels together into flat side walls and ceiling.
5. The locking pins 80 extend and the panel covers 16-6, 18-6, 20-6 retract.
6. The retractable floor 26 extends upward.
7. The inflatable seal 40 inflates.

The room retraction sequence is as follows:

1. The inflatable seal 40 deflates.
2. The retractable floor 26 retracts downward.
3. The locking pins 80 retract and the panel covers 16-6, 18-6, 20-6 extend.
4. The hydraulic actuator begins to retract the room support frame 32 toward the primary support frame 30.
5. Panels 5 and 4 retract within the vehicle and the panel cables 60 release, permitting the panels to fold.
6. Each panel 5 bumper 73 strikes its respective bumper plate 76 forcing panels 5 and 4 fold outward.
7. When the primary support frame 30 and room support frame 32 align, the locking pins 80 extend into their receivers 82, locking the frames together, and the panel covers 16-6, 18-6, 20-6 begin to retract. During panel cover retraction, each panel 3 bumper 73 strikes its respective bumper plate 76 causing panels 3 and 2 fold outward.
8. The inflatable seal 40 inflates.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A room extendable and retractable with respect to a primary structure, comprising
    (a) a primary support frame having a top, a first side, a second side, and a bottom, said primary support frame secured to a side of the play-structure;
    (b) a room support frame having a top, a first side, a second side, and a bottom, said room support frame movable with respect to said primary support frame between a retracted position adjacent said primary support frame and an extended position removed from said primary support frame;
    (c) an outer wall, secured to said room support frame;
    (d) at least one of
        (1) a folding ceiling, comprised of a plurality of foldable panels, secured along an edge thereof to said room support frame top; said ceiling extending between said room support frame top and said primary sup frame top in a flat, unfolded configuration when said room support frame is extended and folding into an accordion configuration within the primary structure when said room support frame is retracted;
        (2) a first folding side wall, comprised of a plurality of foldable panels, secured along an edge thereof to said room support frame first side; said wall extending between said room support frame side and said primary support frame side in a flat, unfolded configuration when said room frame is extended and folding into an accordion configuration within the primary structure when said room support frame is retracted; and
        (3) a second folding side wall, comprised of a plurality of foldable panels, secured along an edge thereof to said room support frame second side; said wall extending between said room support frame side and said primary support frame side in a flat, unfolded configuration when said room frame is extended and folding into an accordion configuration within the primary structure when said room support frame is retracted; and
    (e) a floor secured to said room support frame bottom; and
    (f) an actuator for moving said room support frame with respect to said primary support frame; and
    (g) further comprising at least one of (1) a ceiling cover, (2) a first side wall cover, and (3) a second side wall cover, secured to said primary support frame for enclosing said at least one of (1) a folding ceiling, (2) a first folding side wall, and (3) a second folding side wall, when in said accordion configuration.

2. The invention as recited in claim 1 wherein said floor is a retractable floor, movable between a lowered, retracted position when said room support frame is retracted and a raised position with said room support frame is extended.

3. The invention as recited in claim 1 and further comprising a stiffener cable passing within said at least one of (1) a folding ceiling, (2) a first folding side wall, and (3) a second folding side wall, said stiffener cable having a taut state whereby said panels are secured in a flat configuration and a slack state whereby said panels may be folded.

4. A room extendable and retractable with respect to a primary structure, comprising:
    (a) a primary support frame secured to the primary structure, said primary support frame having a top, a bottom, a first side and a second side;
    (b) a room support frame having a top, a bottom, a first side and a second side; said room support frame movable with respect to said primary support frame;
    (c) an outer wall secured to said room support frame;
    (d) at least one of
        (1) a foldable ceiling pivotally affixed to said room support frame top;

(2) a first foldable side wall pivotally affixed to said room support frame first side; and (3) a second foldable side wall pivotally affixed to said room support frame second side; and (e) an actuator for moving said room support frame with respect to said primary support frame; and (f) wherein said at least one of a foldable ceiling, a first foldable side wall and a second foldable side wall are comprised of a plurality of elongate panels having inner and outer faces and interlocking tongue and groove edges, said panels hingedly secured together along said interlocking edges and further including an internal cable running within and between said panels for locking said panels into a flat configuration when said cable is in a taut state.

5. A room expendable and retractable with respect to a primary structure, comprising:

(a) a primary support frame secured to the primary structure, said primary support frame having a top, a bottom, a first side and a second side;

(b) a room support frame having a top, a bottom, a first side and a second side; said room support frame movable with respect to said primary support frame;

(c) an outer wall secured to said room support frame;

(d) at least one of (1) a foldable ceiling pivotally affixed to said room support frame top;

(2) a first foldable side wall pivotally affixed to said room support frame first side; and (3) a second foldable side wall pivotally affixed to said room support frame second side; and (e) an actuator for moving said room support frame with respect to said primary support frame; and (f) further comprising at least one of (1) a ceiling cover, (2) a first side wall cover, and (3) a second side wall cover, secured to said primary support frame for enclosing said at least one a folding ceiling, a first folding side wall and a second folding side wall when in a folded configuration.

* * * * *